Figure 1:
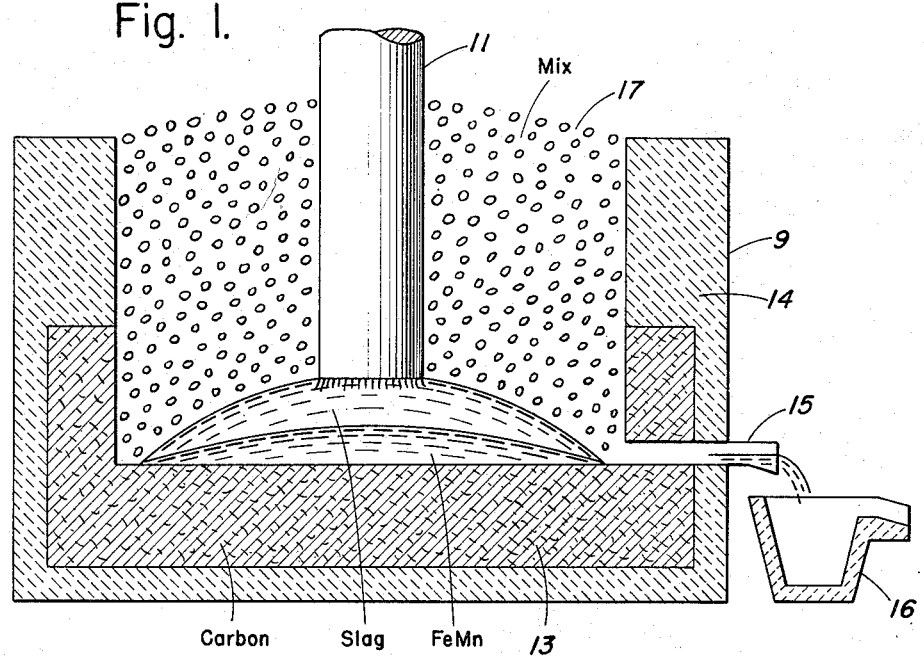

Dec. 25, 1956  M. J. UDY  2,775,518
MANGANESE RECOVERY
Filed March 10, 1953

INVENTOR
Marvin J. Udy
BY
Donald F. McCarthy
ATTORNEY

United States Patent Office 2,775,518
Patented Dec. 25, 1956

2,775,518

MANGANESE RECOVERY

Marvin J. Udy, Niagara Falls, N. Y., assignor to Strategic-Udy Metallurgical & Chemical Processes Limited, Hamilton, Ontario, Canada Application March 10, 1953, Serial No. 341,415

7 Claims. (Cl. 75—11)

This invention relates to metallurgy and has for an object the provision of an improved metallurgical process. More particularly, the invention relates to the provision of an improved process for recovering manganese in metallic form from manganese-bearing materials. A particular object of the invention is to provide an improved process for recovering manganese in metallic form from manganese-bearing ores containing manganese in oxide form. A further object of the invention is to provide an improved process for recovering manganese in metallic form from materials containing manganese in the form of manganese silicate. A further object of the invention is to provide an improved two-stage process for recovering manganese in metallic form from manganese-bearing materials containing manganese in oxide form in the first stage of which the manganese oxide-bearing material is smelted with a controlled amount of carbonaceous reducing material and a controlled amount of fluxing material to effect reduction to the metallic state of a predetermined amount of manganese and in the second stage of which manganese silicate-bearing slag produced in the first stage is smelted in the presence of a controlled amount of basic fluxing material and a controlled amount of reducing material.

According to some heretofore customary practices in the smelting of manganese oxide-bearing materials with solid carbon, substantial quantities of basic fluxing materials such as lime (as such or as limestone) and dolomite are employed for fluxing acid components such as silica. Such practices result in the production of large quantities or volumes of high-melting point slags. The production of high-melting point slags requires the use of high temperatures to produce fluid (or workable) slags, and the use of high temperatures results in high volatilization losses of manganese. The production of large quantities or volumes of slags contributes further to the loss of manganese by providing large volumes of solvent or vehicle for manganese or manganese compounds from which it is impossible to recover manganese economically.

I have found that substantial advantages with respect to manganese recovery may be obtained by avoiding the addition of any basic fluxing material (or any substantial amount of basic fluxing material) to a charge of manganese oxide-bearing material to be subjected to a smelting treatment in the presence of a solid carbonaceous reducing agent such as coal or coke.

In accordance with my invention, manganese oxide-bearing ores, concentrates and the like, in which the manganese is present in the form of one or more higher oxides than manganous oxide (MnO), as for example in the form of manganese dioxide ($MnO_2$) or hausmannite ($Mn_3O_4$) or both, are smelted with solid carbonaceous reducing material under such conditions as to utilize as a basic fluxing material manganous oxide (MnO) rather than any substantial amount of an added basic fluxing material such as lime or dolomite in any form. I have found that, by utilizing the basic properties of manganous oxide (MnO) in smelting high-grade manganese oxide-bearing ores with a solid carbonaceous reducing agent, the smelting temperature required is sufficiently low that volatilization of manganese is substantially completely avoided, and the volume of slag produced is sufficiently small that recoveries of manganese in the metallic state are of the order of eighty percent (80%) to eighty-five percent (85%) even when the slag contains as much as thirty percent (30%) to forty percent (40%) of manganese. In carrying out such a process in a submerged arc electric furnace, power consumption is of the order of two thousand kilowatt hours (2000 kwh.) per ton of standard grade ferromanganese produced which represents a saving of approximately forty-two percent (42%) of the power usually required for carrying out electric furnace processes of the types employed heretofore.

In carrying out a process of the invention for smelting a charge comprising manganese oxide-bearing ore or concentrates involving utilization of manganous oxide (MnO) as a basic fluxing material, the smelting charge employed may consist essentially of the manganese oxide-bearing material and solid carbonaceous reducing material such as coal or coke. The components of the charge are so proportioned as to provide carbonaceous reducing agent in amount sufficient to reduce to the metallic state all of the iron of iron oxide that may be present and to reduce manganese of the higher oxide or oxides of manganese partially to the metallic state and partially to the manganous oxide (MnO) state, provision being made for retention of manganese in the form of manganese oxide in amount sufficient to form with the other basic components of the ore or concentrates and with silica present in the ore or concentrates slag having a molecular base to acid ratio above 1.5 to 1.0 and preferably in the range 1.7 to 2.2 molecules of base to 1.0 molecule of acid (silica). A ratio of about 2.0 molecules of base to 1.0 molecule of acid (silica) is highly effective.

In calculating charges for smelting manganese oxide-bearing ores and concentrates, I prefer to calculate the bases like calcium oxide (CaO), magnesium oxide (MgO) and barium oxide (BaO) contained in the ore or concentrates to calcium oxide equivalency and then proportion the amount of reducing agent to provide for retention, in slag resulting from smelting the charge, of magnanous oxide (MnO), calculated to calcium oxide equivalency, sufficient that the slag will contain total base to acid in the ratio, 2.0 base to 1.0 acid, that is, the slag will contain the bases $MnO+MgO+CaO+BaO$ and the acid component silica ($SiO_2$) in the ratio of about 2.0 base to 1.0 acid (which for the purposes of forming the charge may be calculated either on a weight basis or on a molecular basis).

Alumina ($Al_2O_3$) when present in the ore or concentrates in small amounts may be disregarded. If alumina is present in sufficient quantity to warrant consideration in determining the base-acid ratio, it is desirable to calculate it as a lime (CaO) equivalent and to base its lime equivalency on oxygen equivalency.

The capacity of that phase of the invention involving utilization of manganous oxide as a basic fluxing material to produce small quantities or volumes of slags which may be relatively high in manganese content permits advantageous co-operative use of that phase of the invention involving the smelting of manganese silicate-bearing material in an electric furnace process employing combined electric arc and resistance heating to provide a two-stage or combination process in which recovery of ninety-five percent (95%) or more of the manganese of high-grade manganese oxide-bearing ores and concentrates can be accomplished economically.

That phase of the invention involving the smelting of manganese silicate-bearing material utilizes heat contained in molten slag as the source of heat for promoting the reduction to the metallic state of manganese contained in manganese oxide displaced from chemical combination with silica. In a process of the invention, a charge comprising (1) manganese silicate-bearing material, (2) fluxing material for combining with silica combined with manganous oxide in the manganese silicate-bearing material and (3) solid non-carbonaceous or carbonaceous material is placed on the surface of a molten slag bath maintained at a temperature sufficiently high to provide substantially all of the heat required for displacing manganous oxide chemically combined with silica in the manganese silicate-bearing material with the production of a silicate in which the manganous oxide is replaced by the fluxing material for smelting the resulting silicate with the production of molten slag and for promoting and effecting reduction to the metallic state of the manganese of the displaced manganous oxide of the charge by means of the reducing material of the charge with the production of molten metallic manganese which is separated from the molten slag. Iron oxide or metallic iron may be included in the charge, if desired, to provide for the production of a suitable grade of ferromanganese.

In a combination or two-stage process of the invention, the manganese silicate preferably is introduced while molten into the furnace employing combined electric arc and resistance heating and the reducing material and fluxing material are placed on the surface of the molten slag bath in solid form.

In employing combined electric arc and resistance heating (arc-resistance heating) for maintaining the molten slag bath at the desired temperature, I prefer to employ a covered electric arc furnace provided with one or more vertically extending electrodes. In operating such a furnace during the course of a process of the invention, I maintain the arcing tips of the one or more electrodes in sufficiently close proximity to the upper surface of the molten slag bath to inhibit dissipation of the arc-developed heat by reflection and to insure delivery to the molten slag bath of substantially all of the arc-developed heat, and I introduce charge material which comprises a carbonaceous reducing agent into the furnace and onto the surface of the molten slag bath therein at a rate such as to maintain a low-pressure zone adjacent the arcing tips of the one or more electrodes.

The establishment of low-pressure zones results in avoidance of the frequent periodic blowing of the charge out of the furnace with the consequent danger to operators and disturbance of the operation that takes place because of unpredictable and uncontrollable rates of reaction in high pressure zones created by establishing deep beds of charge material around the electrodes in accordance with heretofore customary practices.

Introduction of charge into the interior of the arc-resistance electric furnace is carried out at a rate such that it is deposited on the surface of the molten bath between the furnace walls and the electrodes without flowing into contact with the electrodes or at a rate such that it flows into contact with the electrodes and builds up around the electrodes to a depth of only a few inches.

The use of a covered electric furnace providing combined electric arc and resistance heating (arc-resistance heating) in accordance with the invention permits effective control of carbon in the molten ferromanganese produced.

Dissipation of the arc-developed heat by reflection may be inhibited satisfactorily by maintaining arcs not greater in length than about one-half inch. A zone of suitably low pressure adjacent the one or more electrodes may be maintained by limiting the depth of charge material immediately adjacent the one or more electrodes to a maximum of twelve (12) inches.

In operating the electric furnace employing arc-resistance heating in accordance with a preferred process of the invention, the tips of the one or more electrodes preferably are maintained in positions with respect to the vertical ranging between about one-half inch (½") above the surface of the slag bath and two inches (2") below the surface of the slag bath. Immersion or penetration of the one or more electrodes in or into the molten slag bath to a depth short of that which will permit wetting of the electrodes by the slag will permit retention of the arc-resistance heating character of the operation. Tapping of the furnace is controlled to maintain in the furnace a slag bath having a depth not less than about three inches (3") in order always to maintain between the arcing tips of the electrodes and the metal beneath the slag bath a layer of slag at least one inch (1") in depth.

Through operation of the furnace constantly as an arc-resistance furnace with short arcs and constant or substantially fixed resistance by controlling the depth of the molten slag bath and the positions of the electrodes, I am able to operate constantly at power factor of 95% as compared with power factors of 75% to 85% at which arc electric furnaces, particularly steel furnaces, are operated in accordance with the heretofore customary practices.

In the operation of the electric furnace, automatic electrode regulators are set to maintain the electrodes in constant or substantially fixed positions relatively to the surface of the molten slag bath, because, for a particular type of operation, the slag is of substantially constant composition and, therefore, of substantially constant resistance. When an increase or decrease in the temperature of the molten slag bath is desired for a particular operation, the voltage is increased or decreased and the electrode regulator is adjusted to maintain the arc length within the desired range (equivalent to the arc length established by maintaining the arcing tips of the electrodes in a position relatively to the vertical between about one-half (½") inch above the surface of the slag bath and two inches (2") below the surface of the slag bath). In following this procedure, the resistance is maintained constant and, consequently, the power input is increased or decreased.

That phase of the invention involving the use of manganous oxide as a basic flux may be carried out in an electrically heated furnace or in a combustion-heated furnace, as, for example, in a blast furnace. If the economics of a situation indicate that a recovery of about eighty percent (80%) is adequate, a single stage process may be employed, and the slag may be discarded. If, on the other hand, the economics of a situation indicate that a recovery of ninety percent (90%) or higher is required or desirable, the slag should be treated to effect a further recovery of manganese, and the controllable factors and conditions should be adjusted in accordance with various factors including that relating to the quality of the metallic manganese product sought to be produced, the essential or required recovery of manganese and the economics of each of the two stages.

As hereinbefore indicated, a charge comprising manganese silicate should be smelted in the presence of sufficient base other than mangamous oxide (such, for example, as lime, CaO or magnesia, MgO) to displace from chemical combination with silica manganous oxide (MnO) functioning as a base in the slag and to permit reduction (by means of added reducing agent) of the manganese of the manganous oxide. This is true whether the manganese silicate mineral is a natural mineral, solidified slag from a preceding operation or molten slag from a preceding operation.

In carrying out reduction of the manganese of manganese silicate from any source in accordance with the invention, any suitable reducing agent (carbonaceous or non-carbonaceous) may be employed. When a carbonaceous reducing agent is employed, it is advisable to produce, by the addition of basic slag forming material, a basic slag containing calcium oxide in amount sufficient to provide for the formation of at least a small amount of calcium carbide in order to insure the development of conditions capable of effecting substantially complete reduction to the metallic state of manganese contained in the manganous oxide displaced by a stronger base from chemical combination with silica. When a non-carbonaceous reducing agent is employed, it is desirable to employ basic slag forming material in an amount required for combining with any acid component formed as the result of oxidation of the non-carbonaceous reducing agent as well as the amount required to effect displacement of manganous oxide (MnO) from chemical combination with an acid substance like silica to facilitate reduction to the metallic state of the manganese of the displaced manganous oxide. Thus, for example, when silicon is employed in the form of ferrosilicon or silicomanganese, it is advisable to take into consideration and provide for, if necessary, the fluxing, by means of basic fluxing material, of silica ($SiO_2$) formed in reducing to the metallic state the manganese of the manganous oxide.

Different procedures may be followed in treating ores of different grades with respect to quantities of basic slag forming materials, other than oxides of manganese, naturally present in the ore or concentrates and with respect to quantities of diluent material like iron or impurities like phosphorus, arsenic, lead and copper. Thus, for example, when an ore or concentrate contains iron in a proportion greater than that desired in the ferromanganese product sought to be produced, the ore or concentrate preferably is smelted under conditions adjusted to reduce to the metallic state the excess iron without reducing to the metallic state any substantial amount of the manganese and with the production of molten metallic iron and molten manganese silicate-bearing slag having a base to acid ratio (including manganous oxide as a base) lower than 1.5 molecules of base to 1.0 molecule of acid (silica), the metallic iron is separated from the manganese silicate-bearing slag, and the manganese silicate-bearing slag is smelted in an electric furnace under the influence of combined arc and resistance heating with a suitable reducing agent and in the presence of sufficient basic slag forming material to effect displacement of manganous oxide from the manganese silicate and thus facilitate reduction to the metallic state of the manganese of the displaced manganous oxide.

When the ore or concentrate contains impurities of the type indicated, a procedure similar to that described above with respect to the removal of excess iron preferably is employed. If iron is present in excess of that desired for the final ferromanganese product, the procedure may be identical with that described for the removal of excess iron, as the impurities will be removed with and will be found in the metallic iron product which may be discarded or utilized in a manner dictated by the economics of the particular situation.

When the ore or concentrate containing impurities is deficient in iron, iron in metallic form or in the form of iron oxide may be incorporated in suitable amount in a charge comprising the ore or concentrate, and a procedure similar to that described for the removal of excess iron may be employed to effect collection of the impurities in a metallic iron product for suitable utilization or disposal.

It is to be understood that the invention contemplates the appropriate use of iron in metallic form or as iron oxide when desired or required for achievement of the production of a metallic manganese-bearing product of any desired grade or quality.

The two-stage process of the invention for treating manganese oxide-bearing materials may be controlled to produce virtually all commercial grades of ferromanganese. Usually, in the first stage, a carbonaceous reducing agent is employed, and molten metal and molten manganese silicate slag are produced. The molten metal may consist largely of iron or iron and impurities or it may consist of high-carbon ferromanganese. When the molten metal of the first stage consists largely of iron or iron and impurities, the metal and the manganese silicate-bearing slag are separated, and the slag may be smelted (1) with a carbonaceous reducing agent to produce high-carbon ferromanganese or (2) with a non-carbonaceous reducing agent to produce low-carbon ferromanganese, or (3) with both a carbonaceous reducing agent and a non-carbonaceous reducing agent to produce medium-carbon ferromanganese of a selected or predetermined carbon content between that of low-carbon ferromanganese and high-carbon ferromanganese.

When the molten metal of the first stage consists of high-carbon ferromanganese, the molten metal may be separated from the slag as a commercial product, and the manganese silicate-bearing slag may be treated as indicated above to produce a ferromanganese product of a desired quality with respect to manganese, carbon and iron contents, or, the metal and the manganese silicate may be treated together in the second stage in accordance with the process of the invention with a carbonaceous reducing agent or a non-carbonaceous reducing agent to produce high-carbon ferromanganese or to produce medium-carbon ferromanganese.

In the production of low-carbon ferromanganese, the silicon of low-carbon silicomanganese may be utilized advantageously as the non-carbonaceous reducing agent. In the production of medium-carbon ferromanganese, the silicon of medium carbon ferromanganese may be utilized advantageously. When the charge to be treated is deficient with respect to the quantity of iron desired in the final ferromanganese product, low-carbon ferrosilicon or ferrosilicon containing a substantial amount of carbon may be employed instead of or in conjunction with silicomanganese to provide silicon as the non-carbonaceous reducing agent, to provide essential or desired iron and to aid in carbon adjustment.

Figure 2:
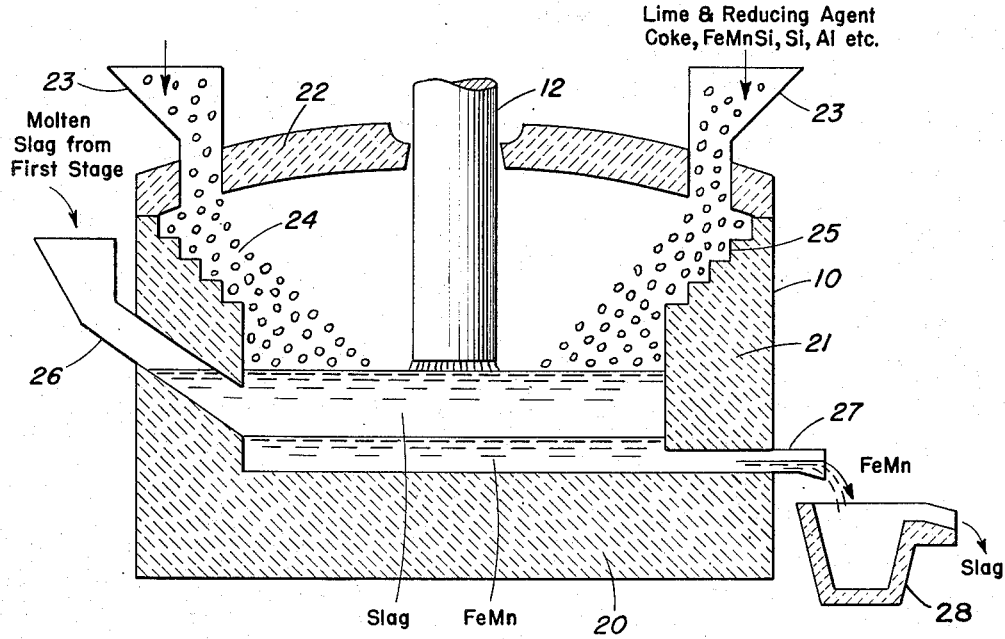

The invention will be better understood from a consideration of the following description in conjunction with the accompanying drawings in which Fig. 1 is a sectional elevation of an open-top arc electric furnace suitable for use in carrying out a process of the invention employing a submerged arc for the development of heat required for smelting a charge comprising ore and a reducing agent such as coke; and Fig. 2 is a sectional elevation of a covered arc electric furnace suitable for use in carrying out a process of the invention employing combined electric arc and resistance heating.

The apparatus shown in the drawings comprises an open-top arc electric furnace 9 and a covered arc electric furnace 10 provided with electrodes 11 and 12 supported by means of conventional holders (not shown) and electrically connected in circuit with conventional control and power supplying means (not shown), including transformer secondaries, voltage regulating means and automatic electrode positioning or adjusting means.

The arc electric furnace 9 may be of any suitable configuration in horizontal cross-section, and it comprises a hearth or bottom portion 13 and side walls 14, all formed of appropriate refractory materials. As indicated, the bottom 13 and a portion of the side walls 14 consist of carbon refractory.

The furnaces 9 and 10 may be provided with any desired number of electrodes connected to sources of single phase or multiple phase electric current.

The furnace 9 is provided with a conventional tapping spout 15 through which molten metal and molten slag may be delivered from the interior of the furnace at appropriate times to a ladle 16. As shown, the arcing tip of the electrode 11 is submerged beneath the surface of the charge 17 in the furnace 9, which charge may comprise or consist of a porous mixture of manganese oxide ore and a carbonaceous reducing agent such as coal or coke.

The arc electric furnace 10 (Fig. 2) may be of any suitable configuration in horizontal cross-section. The furnace 10 comprises a hearth or bottom portion 20, side walls 21 and a roof 22 all formed of appropriate refractory materials.

The roof 22 is provided with a suitable opening through which the electrode 12 extends and which permits vertical movement of the electrode in accordance with operational demands and characteristics. The space between the electrode and the edge of the opening through which the electrode extends or projects may be provided with any suitable conventional packing or sealing means to inhibit or restrict or prevent the flow of gases between the interior and the exterior of the furnace without interfering with the necessary vertical movement of the electrode.

Hoppers 23 having their lower portions extending through and sealed in openings in the roof 22 are provided adjacent the outer side edges of the arc electric furnace 10 in alinement with the electrode to permit the introduction of charge materials 24 into the interior of the furnace.

The portions 25 of the side walls of the furnace immediately beneath the hoppers 23 preferably are so designed as to provide a slope corresponding to or equivalent to the angle of repose of the charge material comprising basic fluxing material such as lime and a carbonaceous or non-carbonaceous reducing agent. Preferably, the sloped portions of the walls are stepped, as shown in the drawings, to provide for the deposition and retention thereon of protective coatings of charge material.

When a carbonaceous reducing agent is included in the charge 24, a conduit (not shown) is provided for communicating with the interior of the furnace 10 through an opening in the roof to permit the collection and utilization of carbon monoxide produced in the process.

A charging spout or runner or launder 26 is provided to permit the introduction into the interior of the furnace 10 of slag to be treated. The slag introduced may be in the molten state or in the solidified and granular or finely divided state. If desired, solid granular or finely divided slag to be treated may be introduced into the interior of the furnace 10 as a component of the charge introduced through the hoppers 23.

The furnace 10 is provided with a conventional tapping spout 27 through which molten metal and molten slag may be delivered from the interior of the furnace to a ladle 28 at appropriate times.

In the treatment of manganese oxide-bearing ore or concentrate, the amount or proportion of the total manganese reduced to the metallic state in the first stage of a two-stage process of the invention normally will be determined by the quality or nature of the product sought to be produced, the composition of the ore particularly with respect to the content of basic slag forming material other than an oxide of manganese naturally present in the ore and economic considerations such as costs of fuel as compared with the cost of electricity.

In view of the necessity or desirability of limiting the base-acid ratio, the maximum amount of manganous oxide to be retained to function as a base may be limited by the amount of other bases present in the ore or concentrate. A high content of other bases may so limit the amount of manganous oxide that can be utilized as a base (with the production of a slag having a base-acid rate in the desirable range, 1.7 to 2.2 molecules of base to 1.0 molecule of acid) as to necessitate the reduction to the metallic state of as much as ninety percent of the manganese contained in a charge. In many, or most, instances, the bases other than manganese oxide are present in such limited quantities that not more than about one-third of the manganese of a charge need be reduced to the metallic state, and two-thirds of the manganese can be utilized in the form of manganous oxide for fluxing purposes.

The following examples illustrate processes of the invention employing manganese oxide ore and coke and manganese silicate and coke or silicomanganese of the indicated average compositions with respect to pertinent components or constituents:

MANGANESE OXIDE ORE (HIGH GRADE)

| | Percent |
|---|---|
| Manganese (Mn) | 48.00 |
| Calculated as $MnO_2$ | 76.00 |
| Calculated as $Mn_3O_4$ | 66.50 |
| Copper (Cu) | 0.15 |
| Ferric oxide ($Fe_2O_3$) | 1.20 |
| Alumina ($Al_2O_3$) | 1.20 |
| Barium oxide (BaO) | 2.20 |
| Calcium oxide (CaO) | 5.40 |
| Magnesium (MgO) | 1.09 |
| Silica ($SiO_2$) | 6.50 |
| Phosphorus (P) | 0.03 |

MANGANESE OXIDE ORE (LOW-GRADE, HIGH LIME)

| | Percent |
|---|---|
| Manganese (Mn) | 40.50 |
| Calculated as $MnO_2$ | 64.20 |
| Calculated as $Mn_3O_4$ | 56.40 |
| Calculated as MnO | 52.30 |
| Ferric oxide ($Fe_2O_3$) | 1.12 |
| Alumina ($Al_2O_3$) | 3.20 |
| Barium oxide (BaO) | 2.45 |
| Calcium oxide (CaO) | 12.80 |
| Silica ($SiO_2$) | 10.40 |

COKE

| | Percent |
|---|---|
| Fixed carbon (C) | 80.00 |

SILICOMANGANESE

| | Percent |
|---|---|
| Silicon (Si) | 40.00 |
| Manganese (Mn) | 48.00 |
| Iron (Fe) | 12.00 |

*Example 1*

In carrying out a process in accordance with the invention, a charge consisting essentially of low-grade, high-lime ore of the above-indicated composition, coke equivalent to one hundred and forty (140) pounds and metal iron equivalent to sixty-five (65) pounds per one thousand pounds of ore is smelted in a three-phase submerged arc electric furnace to produce a molten metallic product containing about eighty percent (80%) manganese and seven percent (7%) carbon and a molten manganese silicate-bearing slag product of approximately the following composition:

| | Percent |
|---|---|
| Calcium oxide (CaO) | 36.00 |
| Barium oxide (BaO) | 6.90 |
| Manganous oxide (MnO) | 18.90 |
| Alumina ($Al_2O_3$) | 9.00 |
| Silica ($SiO_2$) | 29.30 |

The molten slag thus produced is introduced into an arc electric furnace containing molten slag and subjected to a reducing treatment under the influence of combined electric arc and resistance heating in the presence of sufficient calcium oxide to displace manganous oxide from chemical combination with silica, sufficient carbon in the form of coke to reduce to the metallic state manganese of the displaced manganous oxide and provide carbon for combining with the manganese and metallic iron in amount sufficient to form with the metallic manganese produced ferromanganese containing about eighty percent (80%) of manganese and about seven percent (7%) of carbon.

In an alternative procedure, silicomanganese is substituted for coke in the treatment of the molten slag to utilize silicon instead of carbon as the reducing agent and produce low-carbon or medium-carbon ferromanganese.

Example II

In carrying out a process utilizing high-grade manganese ore for the production of ferromanganese, high-grade manganese oxide ore, a charge consisting essentially of high-grade manganese ore of approximately the above-indicated composition, coke of the indicated composition in an amount equivalent to one hundred and seventy-eight (178) pounds per one thousand pounds of ore and metallic iron (scrap) equivalent to sixty-one pounds per one thousand pounds of ore is subjected to a reducing treatment in a submerged arc electric furnace to produce a molten metallic product containing about eighty percent (80%) of manganese and about seven percent (7%) of carbon and a molten manganese silicate-bearing slag product of approximately the following composition:

| | Percent |
|---|---|
| Calcium oxide (CaO) | 23.20 |
| Barium oxide (BaO) | 9.70 |
| Magnesium oxide (MgO) | 4.60 |
| Manganous oxide (MnO) | 29.40 |
| Alumina ($Al_2O_3$) | 5.10 |
| Silica ($SiO_2$) | 27.90 |

Molten slag thus produced is subjected to a reducing treatment under the influence of combined electric arc and resistance heating in a furnace containing a bath of molten slag and in the presence of calcium oxide in amount sufficient to displace manganous oxide from chemical combination with silica and carbonaceous reducing material such as coke in amount sufficient to reduce to the metallic state the manganese of the displaced manganous oxide. The calcium oxide and coke preferably are employed in the form of solid particles which are placed on the surface of the molten slag bath within the furnace, the calcium oxide and the coke being employed in amounts sufficient to provide for the production of calcium carbide to insure substantially complete reduction to the metallic state of manganese contained in the slag.

In such a process for treating slag, metallic iron (in the form of scrap iron or steel, for example) is incorporated in the charge, if desired, to provide for the production of a ferromanganese product containing iron and manganese in suitable proportions.

In alternative processes of the invention, non-carbonaceous reducing agents such, for example, as silicon, aluminum and magnesium as such or in the form of low-carbon alloys may be employed as reducing agents in the treatment of the slag to provide for or permit the production of low-carbon and medium-carbon grades of ferromanganese, as distinguished from the high-carbon products formed or produced when carbonaceous reducing agents are employed.

I claim:

1. In a process for producing ferromanganese from a charge comprising oxides of manganese, iron, calcium and silicon in chemical combination; the improvement that comprises, subjecting the charge in the form of a molten slag bath to the action of a reducing agent in a covered open-arc electric furnace provided with one or more vertically extending electrodes; maintaining the slag bath at a temperature sufficiently high, with combined arc-resistance and slag-resistance heating obtained by operating the furnace with the arcing tips of the one or more electrodes positioned between about one-half inch (½") above the surface of the molten slag bath and two inches (2") below the surface of the molten slag bath, to effect reduction of the iron and manganese of the charge by means of the reducing agent with the production of molten ferromanganese and molten residual slag relatively low in iron and manganese; and separating the molten ferromanganese from the molten residual slag.

2. The method of producing a metallic manganese-bearing product that comprises, introducing slag containing manganese silicate into a covered open-arc electric furnace containing a molten slag bath and provided with one or more vertically extending electrodes; introducing into the electric furnace and onto the surface of the molten slag bath at points removed from the arcing zones of the electrodes, (1) solid basic fluxing material in amount substantially chemically equivalent as a base to the manganese oxide constituent of the manganese silicate and, (2) reducing material in amount sufficient to reduce to the metallic state the manganese content of the manganese silicate; maintaining the slag bath at a temperature sufficiently high, with combined arc-resistance and slag-resistance heating obtained by operating the furnace with the arcing tips of the one or more electrodes positioned between about one-half inch (½") above the surface of the molten slag bath and two inches (2") below the surface of the molten slag bath, to effect reduction to the metallic state of the manganese content and any oxidized iron contained in the manganese silicate slag with the production of a molten metallic manganese-bearing product and molten residual slag relatively low in manganese and iron; and separating and recovering the molten metallic manganese-bearing product from the molten residual slag.

3. Process as claimed in claim 2 wherein the solid basic fluxing material is calcium oxide and the reducing material is a carbonaceous reducing agent, each being employed in sufficient quantities to insure the production of a small amount of calcium carbide within the molten residual slag.

4. A two-stage process for the production of ferromanganese from manganese-bearing ores comprising oxides of manganese, iron, calcium and silicon that comprises, smelting a charge of the manganese-bearing ore and a controlled amount of carbonaceous reducing material sufficient, (1) to provide for the production of a molten slag product comprising silica and basic oxides including that proportion of the manganese oxide content of the ore necessary to establish a base-acid ratio within the molten slag equivalent to two moles of base for each mole of silica, (2) to effect reduction to the metallic state of at least a portion of the iron oxide content of the ore, and (3) to effect reduction to the metallic state of the manganese oxide content of the ore in excess of that necessary to satisfy the two to one base-acid ratio within the molten slag product, with the production of a molten ferromanganese product; separating and recovering the molten ferromanganese product and transferring the molten slag product to a covered open-arc electric furnace; adding calcium oxide and carbonaceous reducing material to the molten slag in controlled amounts sufficient, (1) to effect displacement of the manganese oxide content of the slag while maintaining the base-acid ratio of the slag at two moles of base for each mole of silica exclusive of manganese oxide, (2) to effect reduction to the metallic state of the manganese oxide content of the slag, (3) to effect reduction to the metallic state of any iron oxide present in the slag, and (4) to provide for the production of a small amount of calcium carbide within the slag; subjecting the molten slag, calcium oxide and carbonaceous reducing material to a smelting treatment within the electric furnace under action of combined arc-resistance and slag-resistance heating with the production of a molten metallic manganese-bearing product and molten residual slag low in manganese and iron and containing a small amount of calcium carbide; and separating and recovering the molten metallic manganese-bearing product from the molten residual slag.

5. A two-stage process for the production of ferromanganese from manganese-bearing ores comprising oxides of manganese, iron, calcium and silicon that comprises, smelting a charge of the manganese-bearing ore and a controlled amount of carbonaceous reducing material sufficient, (1) to provide for the production of a molten slag product comprising silica and basic oxides including that proportion of the manganese oxide content of the ore necessary to establish a base-acid ratio within the molten slag equivalent to two moles of base for each mole of silica, (2) to effect reduction to the metallic state of at least a portion of the iron oxide content of the ore, and (3) to effect reduction to the metallic state of the manganese oxide content of the ore in excess of that necessary to satisfy the two to one base-acid ratio within the molten slag product, with the production of a molten ferromanganese product; separating and recovering the molten ferromanganese product and transferring the molten slag product to a covered open-arc electric furnace provided with one or more vertically extending electrodes; adding calcium oxide to the molten slag in an amount sufficient to effect displacement of the magnanese oxide content of the slag while maintaining the base-acid ratio of the slag at two moles of base for each mole of silica; adding carbonaceous reducing material to the molten slag in an amount sufficient to effect reduction to the metallic state of the manganese oxide content of the slag and to effect reduction to the metallic state of any iron oxide present in the slag; subjecting the molten slag, calcium oxide and carbonaceous reducing material to a smelting treatment within the electric furnace under action of combined arc-resistance and slag-resistance heating obtained by maintaining the arcing tips of the one or more furnace electrodes between about one-half inch (½") above the surface of the molten slag bath and two inches (2") below the surface of the slag bath, with the production of a molten metallic manganese-bearing product and molten residual slag low in manganese and iron; and separating and recovering the molten metallic manganese-bearing product from the molten residual slag.

6. Process as claimed in claim 5 wherein calcium oxide and carbonaceous reducing material are employed in sufficient quantities to provide for the production of a small amount of calcium carbide within the molten residual slag.

7. Process for the production of metallic manganese-bearing products that comprises, forming a charge comprising carbonaceous reducing material and a manganese-bearing mineral product containing silica and containing manganese oxide in an amount in excess of the amount required theoretically to combine chemically with the silica of the manganese-bearing mineral product to produce manganese silicate; subjecting the charge to a first-stage smelting treatment at a temperature sufficiently high to effect reduction to the metallic stage of the manganese of the excess manganese oxide by means of the carbonaceous reducing material contained in the charge with the production of a molten metallic manganese-bearing product and molten slag containing the unreduced manganese of the original charge in the form of manganese silicate; separating and recovering the molten metallic manganese-bearing material from the molten slag, introducing the molten slag containing manganese silicate into a covered open-arc electric furnace provided with one or more vertically extending electrodes and smelting the slag therein together with added calcium oxide and carbonaceous reducing material in amounts sufficient to, (1) effect substantially complete displacement of the manganese oxide constituent of the manganese silicate slag with calcium oxide, (2) reduce to the metallic state the manganese of the manganese silicate, and (3) provide for the formation of a small amount of calcium carbide within the molten slag; maintaining the slag bath within the arc electric furnace under action of combined arc-resistance and slag-resistance heating at a temperature sufficiently high to provide all of the heat required for promoting reduction to the metallic state of the manganese of the manganese silicate and any oxidized iron present in the slag by maintaining the arcing tips of the one or more electrodes between about one-half inch (½") above the surface of the molten slag bath and two inches (2") below the surface of the slag bath, with the production of a molten metallic manganese-bearing product and molten residual slag relatively low in manganese and iron; and separating and recovering the molten metallic manganese-bearing product from the molten residual slag.

References Cited in the file of this patent

UNITED STATES PATENTS

| | | |
|---|---|---|
| 825,348 | Price | July 10, 1906 |
| 2,098,176 | Udy | Nov. 2, 1937 |
| 2,523,092 | Bryk et al. | Sept. 19, 1950 |
| 2,549,994 | Udy | Apr. 24, 1951 |

FOREIGN PATENTS

| | | |
|---|---|---|
| 778,165 | France | Mar. 11, 1935 |